United States Patent
Cutter

(10) Patent No.: US 6,484,238 B1
(45) Date of Patent: Nov. 19, 2002

(54) APPARATUS AND METHOD FOR DETECTING SNOOP HITS ON VICTIM LINES ISSUED TO A HIGHER LEVEL CACHE

(75) Inventor: Douglas J Cutter, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/467,352

(22) Filed: Dec. 20, 1999

(51) Int. Cl.$^7$ ............................................... G06F 12/08
(52) U.S. Cl. ...................................... 711/133; 711/146
(58) Field of Search ................................. 711/146, 133

(56) References Cited

U.S. PATENT DOCUMENTS

| | | | |
|---|---|---|---|
| 4,755,930 A | 7/1988 | Wilson, Jr. et al. | 711/122 |
| 5,228,136 A | 7/1993 | Shimizu et al. | 711/141 |
| 5,263,144 A | 11/1993 | Zurawski et al. | 711/121 |
| 5,303,362 A | 4/1994 | Butts, Jr. et al. | 711/121 |
| 5,404,482 A | 4/1995 | Stamm et al. | 711/145 |
| 5,511,226 A | 4/1996 | Zilka | 711/146 |
| 5,708,792 A | 1/1998 | Hayes et al. | 711/108 |
| 5,717,898 A | 2/1998 | Kagan et al. | 711/145 |
| 5,765,196 A * | 6/1998 | Liencres et al. | 711/134 |
| 5,859,999 A | 1/1999 | Morris et al. | 712/224 |
| 5,860,017 A | 1/1999 | Sharangpani et al. | 712/23 |

OTHER PUBLICATIONS

A. Wolfe, "Techniques of prediction and speculation detailed", Electronic Engineering Times, Feb. 1999; pp. 43–44.

* cited by examiner

Primary Examiner—Reginald G. Bragdon

(57) ABSTRACT

Circuitry for detecting snoop hits during the propagation and storage delay when transmitting a victim address to a bus cluster in a multiprocessor system. The circuitry includes stages for detecting the snoop hits during each cycle of the propagation delay. Each stage includes logic gates for comparing the wordline address with a snoop hit and for outputting a snoop hit signal upon detection of a snoop hit relating to the snoop address.

20 Claims, 5 Drawing Sheets

APPARATUS AND METHOD FOR DETECTING SNOOP HITS ON VICTIM LINES ISSUED TO A HIGHER LEVEL CACHE

FIELD OF THE INVENTION

The present invention relates to an apparatus and method for cache coherency by detecting snoop hits on victim lines issued to a higher level cache in a multiprocessor system.

BACKGROUND OF THE INVENTION

In a multiprocessor system, each processor has its own local cache for storing data. Each processor may write to and read from a shared higher-level cache. Therefore, each processor can access both its own local cache and the shared cache for the entire system. Cache coherency is required to ensure that two processors do not attempt to simultaneously access the same address space of the shared cache. In addition, due to propagation delays within the circuitry of each processor, cache coherency must ensure that attempts to access particular portions of a cache are prioritized.

In particular, when a processor attempts to replace a line in its local cache, it sends a victim address to its victim buffer in order to victimize an address space. At the same time, it transmits the victim address to a bus cluster, which is an internal on-chip interface between the processor and a system bus. The bus cluster manages prioritization of attempts to access the cache. Due to a propagation delay, the victim address transmitted to the bus cluster may require, for example, two clock cycles to reach the bus cluster. During those two clock cycles, another processor may attempt to access the same address space in the shared cache. If that occurs, the bus cluster will not be aware of the conflict resulting from attempts by both processors to access the same portion of the shared cache due to the two clock cycle delay. Therefore, circuitry must account for this type of conflict. In particular, a need exists for detecting snoop hits occurring on the same address space during a propagation delay when transmitting a victim address from a processor to a bus cluster in order to avoid conflicts while accessing the cache.

SUMMARY OF THE INVENTION

A method and apparatus consistent with the present invention includes receiving a victim address for a local cache in a multiprocessor system and transmitting the victim address to a bus cluster interfacing a processor with a system bus. A snoop is received during transmission of the victim address to the bus cluster, and it is determined if the snoop hits the victim address. If the snoop hits the victim address, a unique snoop hit signal is provided.

Another apparatus consistent with the present invention includes a plurality of wordlines corresponding to a victim address that was sent to a bus cluster and a snoop match line for detecting a snoop hit. Logic circuitry, connected to the plurality of wordlines and the snoop hit line, operates to determine if the snoop hit relates to the victim address that is being transmitted to the bus cluster interfacing a processor with a system bus. The logic circuitry also operates to provide a snoop hit signal if the snoop hits a victim address stored in the victim buffer and not yet issued to the bus cluster.

DETAILED DESCRIPTION

Figure 1:
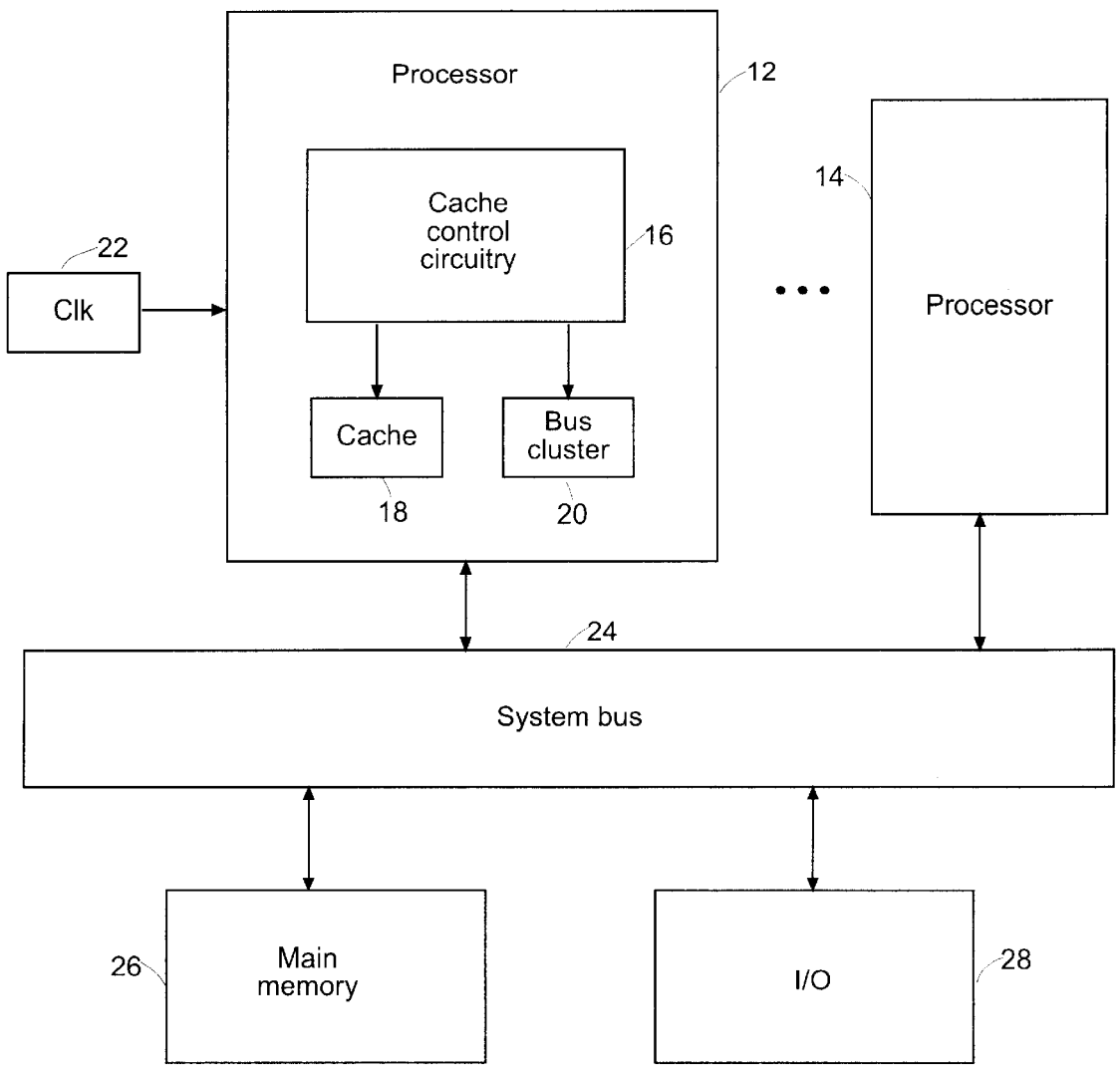
FIG. 1 is a block diagram of a multiprocessor system for implementing an embodiment consistent with the present invention.

FIG. 1 is a block diagram of a multiprocessor system 10 for implementing an embodiment consistent with the present invention. Multiprocessor system 10 includes a plurality of processors 12 and 14 coupled to a system bus 24. System 10 also includes typical components of a main memory 26 coupled to system bus 24 and an input/output (I/O) unit 28 coupled to system bus 24. A clock 22 controls, for example, operation of processor 12 and other components within system 10.

Processor 12 illustrates, for example, certain components used with a local cache. In particular, processor 12 includes cache control circuitry 16 coupled to a local cache 18 and a bus cluster 20. Cache control circuitry 16 may include conventional components for controlling writing to and reading from cache 18 by processor 12. Bus cluster 20 may include conventional components for interfacing processor 12 with system bus 24. In addition, by interfacing processor 12 with system bus 24, bus cluster 20 typically includes conventional components for handling requests by external processors, such as processor 14, to write to and read from local cache 18. Therefore, bus cluster 20 along with cache control circuitry 16 provides for cache coherency by prioritizing requests to access cache 18 and resolving conflicts between such requests. Bus clusters for resolving conflicts in accessing memory are known in the art, and a bus cluster includes any component for interfacing a processor with a system bus and for potentially resolving such conflicts.

Figure 2:
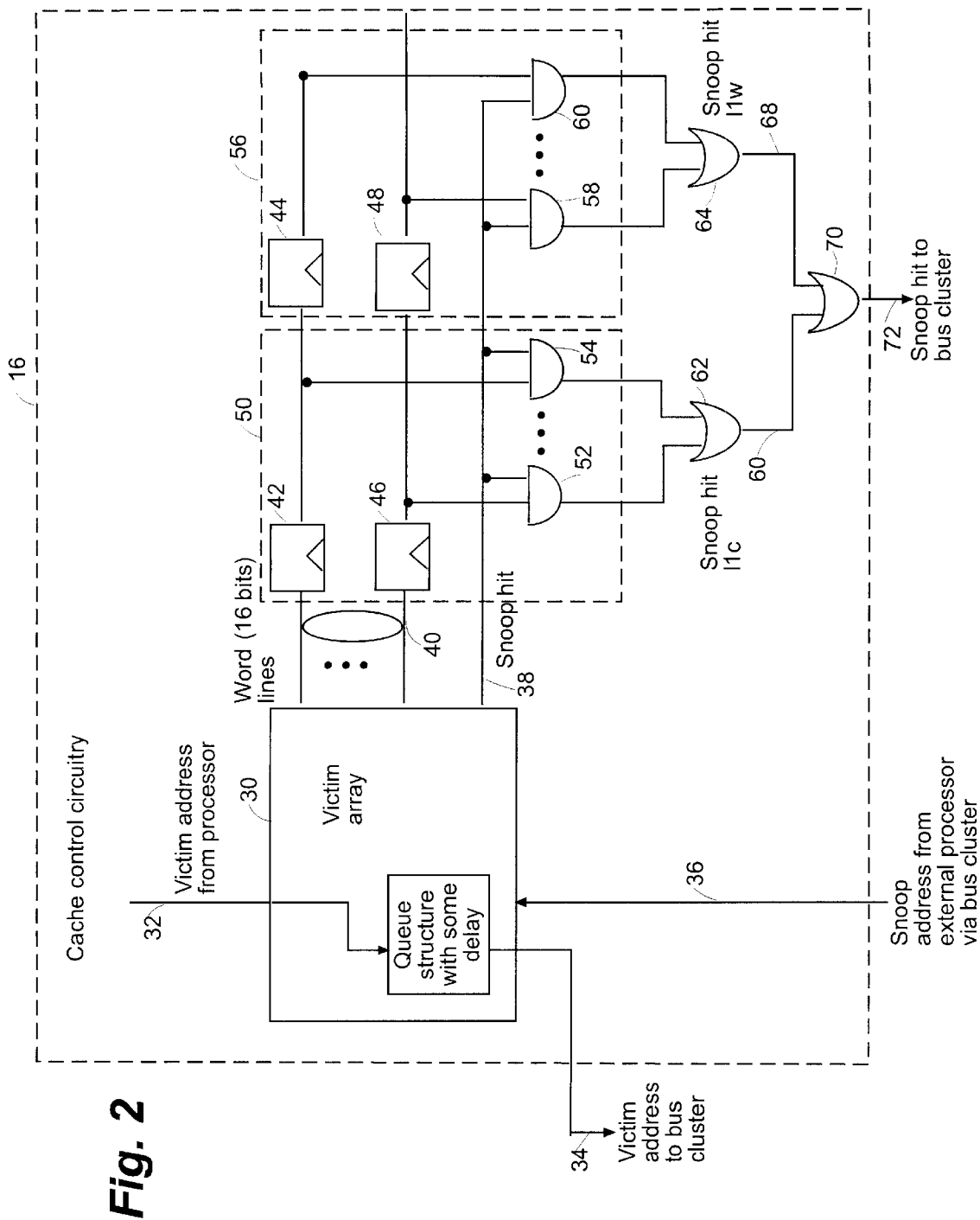
FIG. 2 is a block diagram of logic circuitry within cache control circuitry in a processor for detecting snoop hits on victim lines issued to a cache during propagation delays in a decoded wordline address being transferred to a bus cluster.

FIG. 2 is a block diagram of cache control circuitry 16 including particular components used in controlling cache 18, in addition to other conventional components which may be used. Cache control circuitry 16 handles snoops received during transmission of a victim address to bus cluster 20. A snoop is a method for maintaining cache coherency by sending a desired snoop address onto the system bus in a multiprocessor system so that other cache controllers are able to determine whether or not they have a copy of the desired address in their local cache. In this example, cache control circuitry 16 includes a victim array 30, which receives a victim address on line 32 from processor 12 when the processor attempts to replace a line in its cache 18. A victim address specifies an address space in a cache. The victim address is also transmitted on line 34 to bus cluster 20, through a queue structure in victim array 30 having some delay, in order to notify bus cluster 20 of the access to the victim address. Bus cluster 20 may thus prioritize and resolve conflicts and attempts to write to and read from that same address space by other processors.

Victim array 30 can also receive snoop addresses on line 36 from external processors, such as processor 14, in system 10 attempting to use a certain address space. When victim array 30 contains the same address as that received from an external processor on line 36, it generates a snoop hit indicating an external processor attempts to access the same address space which it has already picked to victimize. Victim array 30 outputs the snoop hit on a snoop hit line 38.

Victim array circuitry, such as victim array 30, for generating such snoop hits is known in the art, and those types of circuitry are also referred to as a victim buffer or a victim queue. A victim array includes necessary components for detecting snoop hits in a multiprocessor system. Snooping includes known techniques for cache coherency in a multiprocessor system, and a snoop hit includes any indication of an attempt to access a cache by an external processor.

When the victim address is transmitted to bus cluster 20 on line 34, it requires in this example a two clock cycle propagation delay to be stored in a queue in bus cluster 20. Therefore, circuitry must ensure that during the two clock cycle delay, snoop hits are detected in victim array 30 and accounted for in order to provide for cache coherency in attempts to access cache 18. The wordlines used to issue the victim address are transmitted on decoded wordlines 40 through two stages 50 and 56, which serve to isolate the snoop hit during each clock cycle of the propagation delay. In particular, each of the wordlines 40 is transmitted through two latches, in this example, latches 42, 44, 46, and 48. Although only four latches are shown in FIG. 2 for simplicity, there are two latches for each wordline, or thirty-two latches in this example. These latches are typically already present in the circuitry of victim array 30 and, therefore, need not in this example be added for the additional logic to detect snoop hits. The exemplary embodiment thus makes use of components already on-chip in a processor and hence reduces the number of additional gates or components otherwise added to the processor for detecting the snoop hits during the propagation delay.

The latches (42, 44, 46, and 48) are further used in stages 50 and 56 to detect snoop hits during the two clock cycle delay in transmission of the decoded wordline address to bus cluster 20. In each of the stages, the latched wordlines 40 are logically compared with snoop hits on line 38 to detect a snoop hit during each cycle of the two clock cycle delay. In particular, first stage 50 includes a plurality of AND gates 52 and 54, each AND gate receiving as inputs the snoop hit on line 38 and one of the address wordlines 42/46. Although only two are shown for simplicity, in this example first stage 50 includes sixteen latches for latching each of the sixteen wordlines 40 as inputs, and sixteen AND gates, in addition to receiving as another input the snoop hit on line 38. The outputs of AND gates 52 and 54 are input to OR gate 62 and output on line 60 as a snoop hit 11c.

Second stage 56 likewise includes a plurality of AND gates 58 and 60, of which only two are shown for simplicity. It actually includes sixteen latches in this example for latching as inputs the address lines 42/46 of the 16-bit wordline, and sixteen AND gates, as well as the snoop hit on line 38 as another input. An OR gate 64 receives as inputs the outputs from AND gates 58 and 60 in second stage 56 and provides an output on line 68 as a snoop hit 11w. The snoop hits 11c and 11w are input to an OR gate 70 which provides a snoop hit output on line 72 to bus cluster 20. The terms 11c and 11w are used only as labels for the snoop detection signals in the two stages 50 and 56.

Therefore, if a snoop hit occurs in victim array 30 during the first clock cycle of the propagation delay, first stage 50 through each of its plurality of AND gates receives an output high on line 38 for the snoop hit and receives at least one high signal on lines 42/46. The wordline may be all zeroes or one out of sixteen bits logically high. This guarantees only one high input to OR gate 62. Second stage 56 likewise functions to detect a snoop hit during the second clock cycle of the propagation delay. In particular, if a snoop hit is detected by victim array 30 during the second clock cycle, snoop hit line 38 receives a high signal indicating the snoop hit and that high signal is logically ANDed in second stage 56 with the decoded wordline address on address lines 44/48, thus providing for at most one high input to OR gate 64.

Therefore, OR gate 70 performs a logic OR operation of the signals from lines 60 and 68, snoop hit 11c and snoop at 11w, and provides a snoop hit signal on line 72. Accordingly, a snoop hit occurring during either the first or the second clock cycle of the propagation delay in transmitting the victim address to bus cluster 20 generates a snoop hit on line 72 to bus cluster 20. In receiving the snoop hit signal, bus cluster 20 may include conventional circuitry for processing the snoop hit signal and determining prioritization of the attempts to access the same address space in cache 18. The snoop hit signal in this example is a logic one or high signal; alternatively, other signals or logic levels may be used for indicating a snoop hit occurring during the propagation delay.

Figure 3:
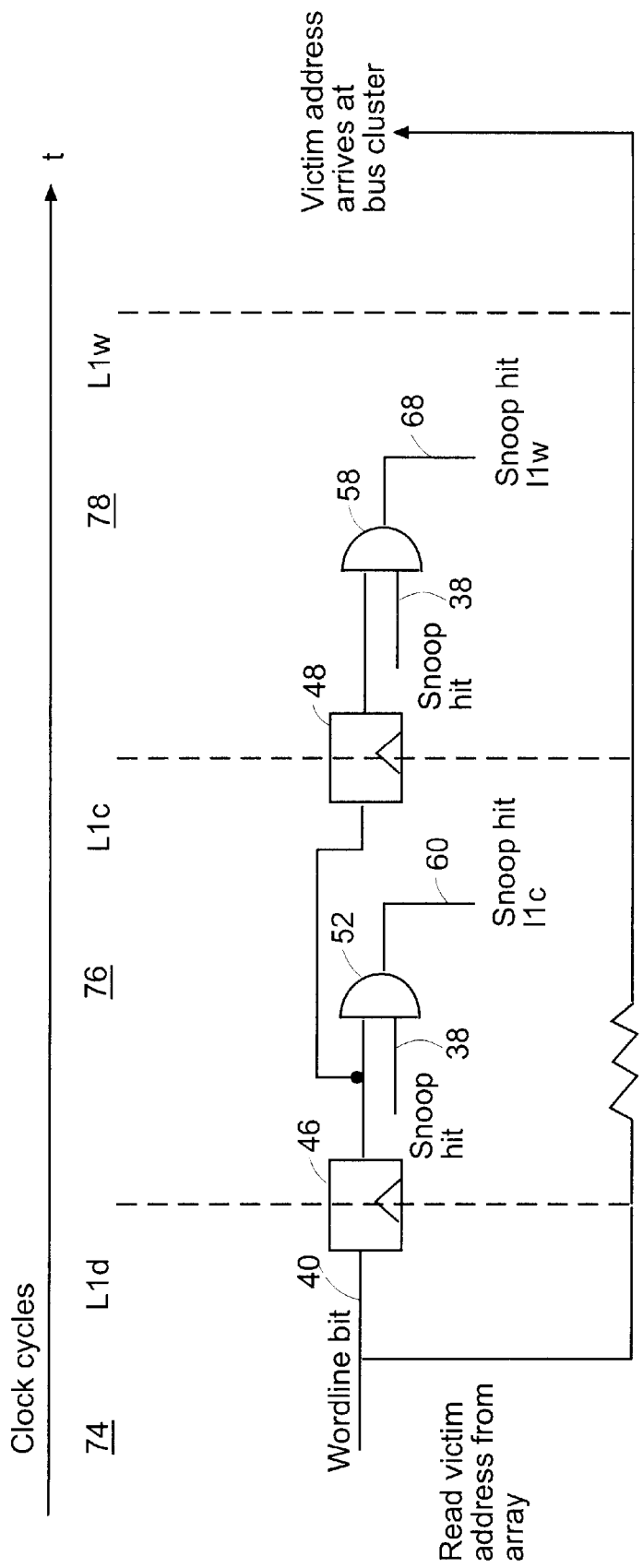
FIG. 3 is a timing diagram illustrating the operation of the logic circuitry in FIG. 2.

FIG. 3 is a timing diagram illustrating detection of snoop hits during each of the clock cycles of the propagation delay in transmitting the victim address to bus cluster 20. For exemplary purposes only, only one bit of the wordlines 40 is shown in this diagram. The timing diagram includes three consecutive clock cycles 74 (L1d), 76 (L1c), and 78 (L1w). During clock cycle 74, the victim address is transmitted from victim array 30 to bus cluster 20. During the first clock cycle 76 of the propagation delay, any snoop hit on line 38 is logically ANDed with a bit of the wordline via AND gate 52. Since at most one bit of the wordline will be a logic one, only one of the AND gates 52 will receive both a high input from the snoop hit on line 38 and a high input from a bit of the wordlines 46, if a snoop hit occurs during this clock cycle. Therefore, AND gate 52, if the snoop hit occurs during clock cycle 76, outputs a logic one or high signal on line 60 as snoop hit 11c.

Likewise, during the second clock cycle 78 of the propagation delay, a snoop hit on line 38 is logically ANDed with the bit of wordline via AND gate 58. If a snoop hit occurs during this clock cycle, at most one bit of the wordline will be a logic one, meaning that only one of the AND gates 58 will receive a high input from the snoop hit on line 38 and a bit of the wordlines 48, outputting a logic one or high signal on line 68 and providing for a snoop hit 11w signal. At the next clock cycle, the victim address arrives at bus cluster 20, as well as any snoop hit signal on line 72 resulting from snoop hit 11c or snoop hit 11w.

Figure 4A:
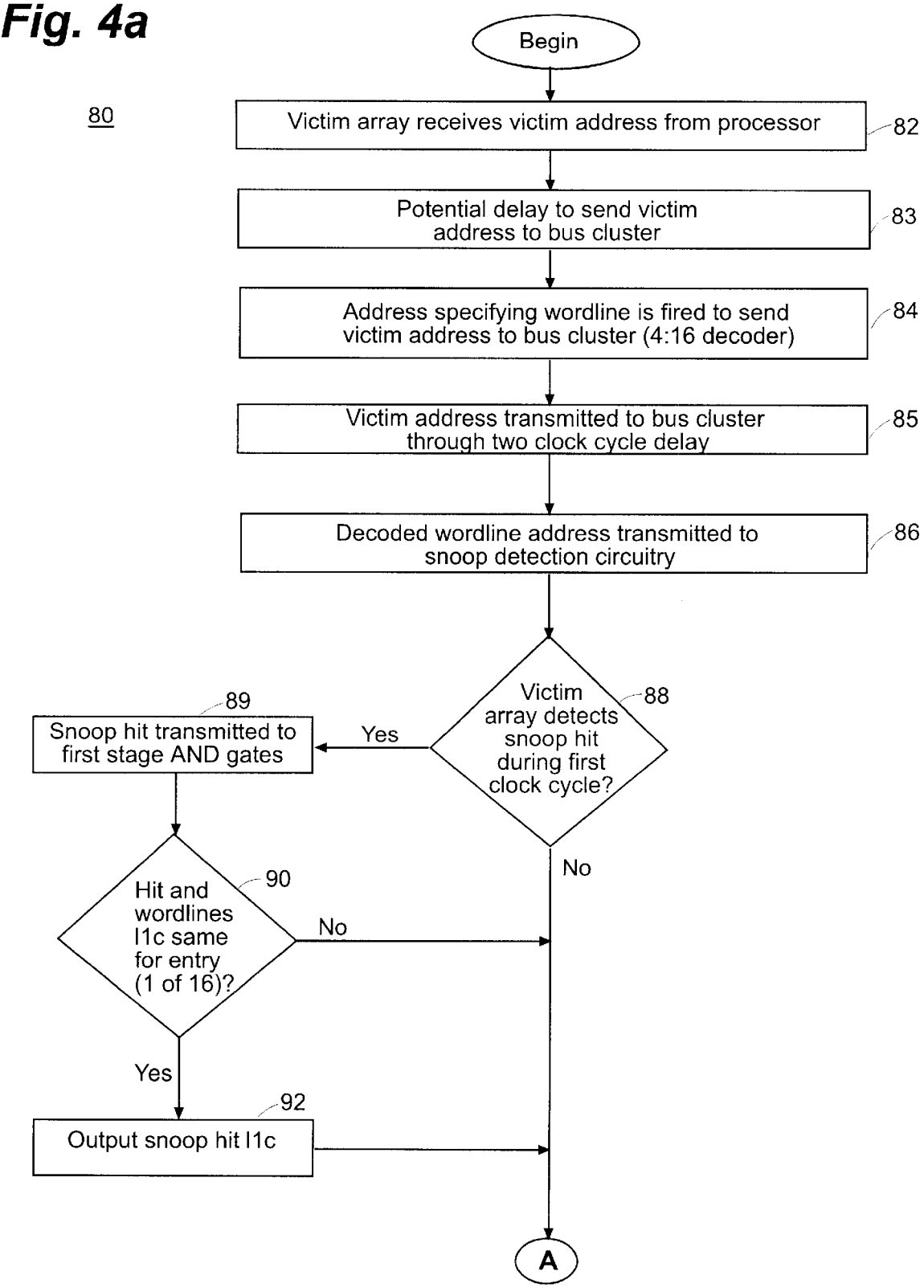
FIGS. 4a and 4b are flow chart illustrating the operation of the logic circuitry in FIG. 2.
Figure 4B:
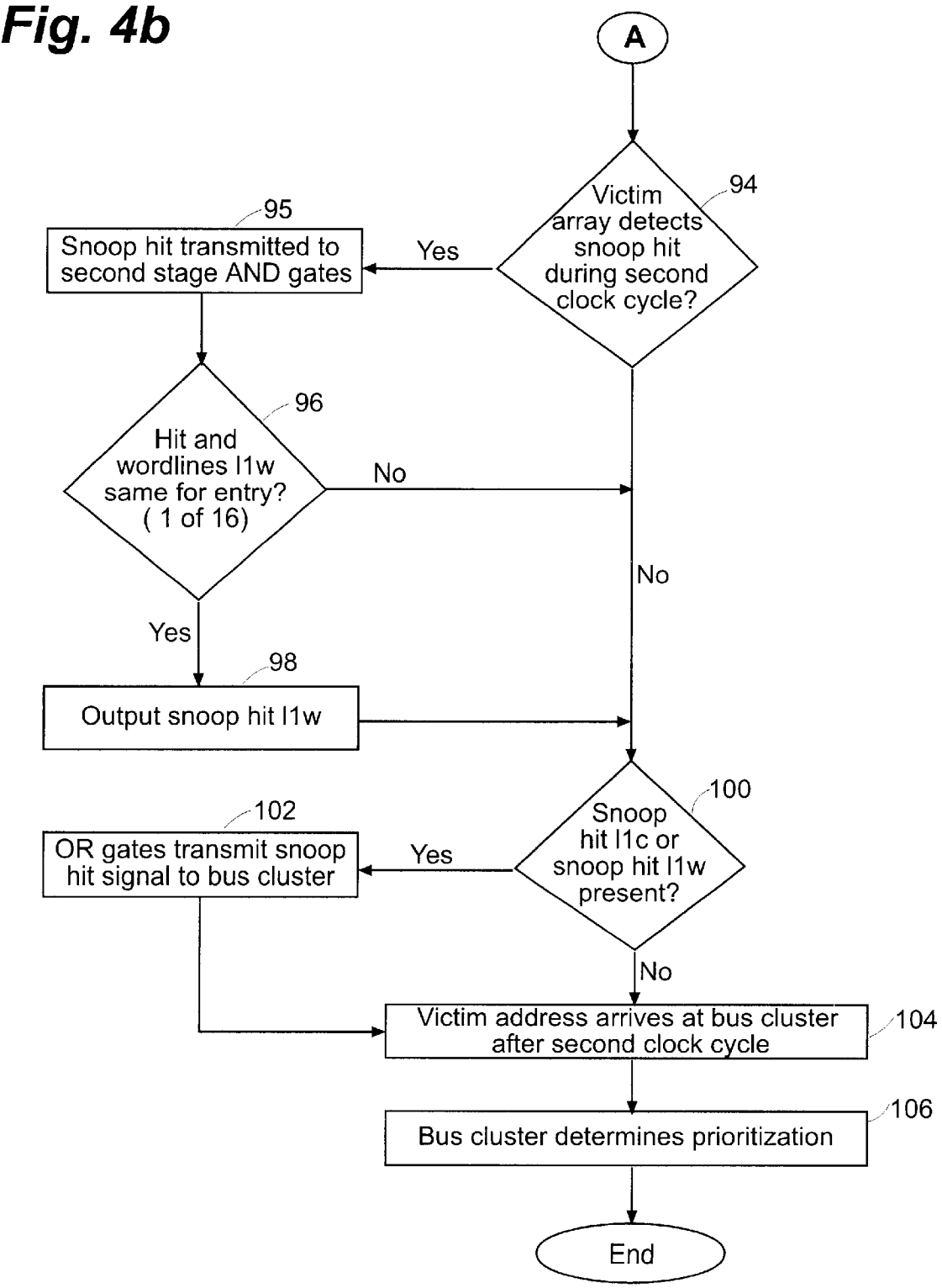

FIGS. 4a and 4b are a flow chart illustrating a method 80 for operation of the logic circuitry in cache control circuitry 16, implemented in hardware modules having the exemplary components described above. In method 80, victim array 30 receives the victim address from processor 12 on line 32 (step 82). After some delay 83 in the victim buffer, an address specifying which victim address to read is decoded using a four-to-sixteen decoder to form wordlines, and the victim address is sent to bus cluster 20 (steps 84 and 85). This may take several clock cycles to propagate to and be stored in a snoopable location within bus cluster 20.

The decoded wordline address is transmitted to snoop detection circuitry in victim array 30 (step 86), which detects whether a snoop hit occurs during the first clock cycle from a snoop address received on line 36 from an external processor (step 88). If a snoop hit occurs, the snoop hit is transmitted to first stage 50 (step 89), which determines if the snoop hit and the wordlines 11c are the same for the entry (step 90). If so, the logic circuitry outputs a snoop hit 11c signal (step 92). During the second clock cycle of the propagation delay, victim array 30 determines if a snoop hit occurs (step 94). If the snoop hit occurs, the snoop hit is transmitted to second stage 56 (step 95), which determines if the snoop hit and the wordlines 11c are the same for the entry (step 96). If so, the logic circuitry outputs snoop hit 11w signal (step 98).

When the snoop hit address arrives at bus cluster 20 after the two clock cycle delay, the logic circuitry determines if a snoop hit 11c or a snoop hit 11w signal is present, as detected in this example by OR gates 62, 64 and 70 (step 100). If the snoop hit 11c or snoop hit 11w signal is present, the OR gates transmit a snoop hit signal to bus cluster 20 on line 72 (step 102), and the victim address also arrives at bus cluster 20 after the second clock cycle propagation delay (step 104). Bus cluster 20 subsequently may use conventional circuitry for receiving the victim address and the snoop hit signal and for determining prioritization of signals for access to cache 18 (step 106).

More or fewer stages, similar to stages 50 and 56, may be used depending upon a propagation delay required to transmit a snoop address to a bus cluster. More or fewer AND gates may be used in stages 50 and 56, depending upon a number of address lines present in a particular embodiment. Also, aside from use of AND gates, other logic circuitry may be used to detect a snoop hit during the propagation delay through other types of logical comparisons between snoop addresses and snoop hits.

While the present invention has been described in connection with an exemplary embodiment, it will be understood that many modifications will be readily apparent to those skilled in the art, and this application is intended to cover any adaptations or variations thereof. For example, different numbers of processors, capacities of the busses, types of processors, types of busses, and labels for the various entities and busses may be used without departing from the scope of the invention. This invention should be limited only by the claims and equivalents thereof.

What is claimed is:

1. A method for providing an indication of address conflicts in attempts to access a local cache in a multiprocessor system, comprising:
    victimizing an address for the local cache;
    transmitting the victim address to a bus cluster interfacing a processor with a system bus;
    receiving a snoop during transmission of the victim address to the bus cluster;
    determining if the snoop hits the victim address by logically comparing the snoop hit with a plurality of wordlines corresponding to the victim address; and
    providing a snoop hit signal if the snoop hits the victim address.

2. The method of claim 1 wherein the determining step includes latching decoded wordline addresses used to transmit the victim address to the bus cluster for multiple clock cycles.

3. The method of claim 2 wherein the determining step includes performing a logic AND operation of the decoded wordline address and the snoop hit.

4. The method of claim 3 wherein the performing step includes performing the logic AND operation for each clock cycle required to transmit the victim address to the bus cluster.

5. The method of claim 4, further including performing a logic OR operation for outputs of the logic AND operations.

6. The method of claim 1 wherein the providing step includes transmitting a snoop hit signal to the bus cluster.

7. The method of claim 1 wherein the determining step includes logically comparing the snoop hit with a decoded wordline address.

8. An apparatus for providing an indication of address conflicts in attempts to access a local cache in a multiprocessor system, comprising:
    a module that receives a victim address for the local cache;
    a module that transmits the victim address to a bus cluster interfacing a processor with a system bus;
    a module that receives a snoop hit during transmission of the victim address to the bus cluster;
    a module that determines if the snoop hits the victim address by logically comparing the snoop hit with a plurality of wordlines corresponding to the victim address; and
    a module that provides a snoop hit signal if the snoop hits the victim address.

9. The apparatus of claim 8 wherein the determining module includes a module that latches a decoded wordline address used to transmit the victim address to the bus cluster for multiple clock cycles.

10. The apparatus of claim 9 wherein the determining module includes a module that performs a logic AND operation of the decoded wordline address and the snoop hit.

11. The apparatus of claim 10 wherein the performing module includes a module that performs the logic AND operation for each clock cycle required to transmit the victim address to the bus cluster.

12. The apparatus of claim 11, further including a module that performs a logic OR operation for outputs of the logic AND operations.

13. The apparatus of claim 9 wherein the determining module includes a module that logically compares the snoop hit with the decoded wordline address.

14. The apparatus of claim 8 wherein the providing module includes a module that transmits a snoop hit signal to the bus cluster.

15. An apparatus for providing an indication of address conflicts in attempts to access a local cache in a multiprocessor system, comprising:
    a plurality of decoded wordlines for issuing a victim address;
    a snoop hit line for indicating a snoop hit; and
    logic circuitry connected to the plurality of decoded wordline address lines and the snoop hit line, the logic circuitry operating to:
        determine if the snoop hit relates to the decoded wordline address while the victim address is being transmitted to a bus cluster interfacing processor with a system bus; and
        provide a snoop hit signal if the snoop hit relates to the victim address.

16. The apparatus of claim 15 wherein the logic circuitry includes a plurality of stages for logically comparing the decoded wordline address with the snoop hit during each clock cycle of transmission of the victim address to the bus cluster.

17. The apparatus of claim 16 wherein each of the plurality of stages includes a plurality of logic AND gates each having inputs coupled to receive a bit of the decoded wordline address and snoop hit.

18. The apparatus of claim 17, further including a logic OR gate having inputs coupled to receive outputs of the AND gates and having an output providing a snoop hit signal.

19. The apparatus of claim 15 wherein the logic circuitry operates to logically AND the snoop hit with the decoded wordline address.

20. The apparatus of claim 19 wherein the logic circuitry further operates to logically OR outputs of the logic AND operation.

\* \* \* \* \*